United States Patent
Ito

(10) Patent No.: US 8,520,948 B2
(45) Date of Patent: Aug. 27, 2013

(54) IMAGE PROCESSING APPARATUS AND IMAGE PROCESSING METHOD

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 13/011,248

(22) Filed: Jan. 21, 2011

(65) Prior Publication Data

US 2011/0200253 A1 Aug. 18, 2011

(30) Foreign Application Priority Data

Feb. 18, 2010 (JP) .................................. 2010-034104

(51) Int. Cl.
*G06K 9/34* (2006.01)

(52) U.S. Cl.
USPC ............................ 382/178; 382/171; 382/173

(58) Field of Classification Search
USPC ......... 382/100, 171, 173, 167, 178; 359/237, 359/290, 291; 358/3.26, 1.14; 250/493.22; 345/153, 177; 349/5, 57, 66, 122; 347/9, 347/91
See application file for complete search history.

(56) References Cited

U.S. PATENT DOCUMENTS

| | | | | |
|---|---|---|---|---|
| 5,841,145 A | * | 11/1998 | Satoh et al. | 250/492.22 |
| 5,847,721 A | * | 12/1998 | Ogata et al. | 347/9 |
| 6,587,158 B1 | | 7/2003 | Adams et al. | |
| 6,801,636 B2 | * | 10/2004 | Murakami et al. | 382/100 |
| 2009/0033766 A1 | | 2/2009 | Ito | |
| 2010/0296732 A1 | | 11/2010 | Ito | |

FOREIGN PATENT DOCUMENTS

| | | |
|---|---|---|
| CN | 101222636 A | 7/2008 |
| EP | 0 998 117 A2 | 5/2000 |
| JP | 2000-312288 A | 11/2000 |
| JP | 2006-139606 | 6/2006 |
| JP | 2009-302965 A | 12/2009 |

OTHER PUBLICATIONS

European Search Report dated Aug. 10, 2012, issued in counterpart European Application No. 11150691.1-2202/2362632.
Chinese Office Action dated May 31, 2013, issued in counterpart Chinese Application No. 201110038935.5, and English-language translation thereof.

* cited by examiner

*Primary Examiner* — Anh Do
(74) *Attorney, Agent, or Firm* — Fitzpatrick, Cella, Harper & Scinto

(57) ABSTRACT

An image processing apparatus for performing image processing for a plurality of band areas obtained by dividing image data is provided. The apparatus includes a dividing unit configured to divide the image data such that each of the plurality of band areas has an area overlapping an adjacent band area, and an image processing unit configured to perform the image processing for the band areas with respect to each of a plurality of planes that constitute the image data. A processing range within a band area used in the image processing by the image processing unit differs between at least two planes among the plurality of planes.

17 Claims, 13 Drawing Sheets

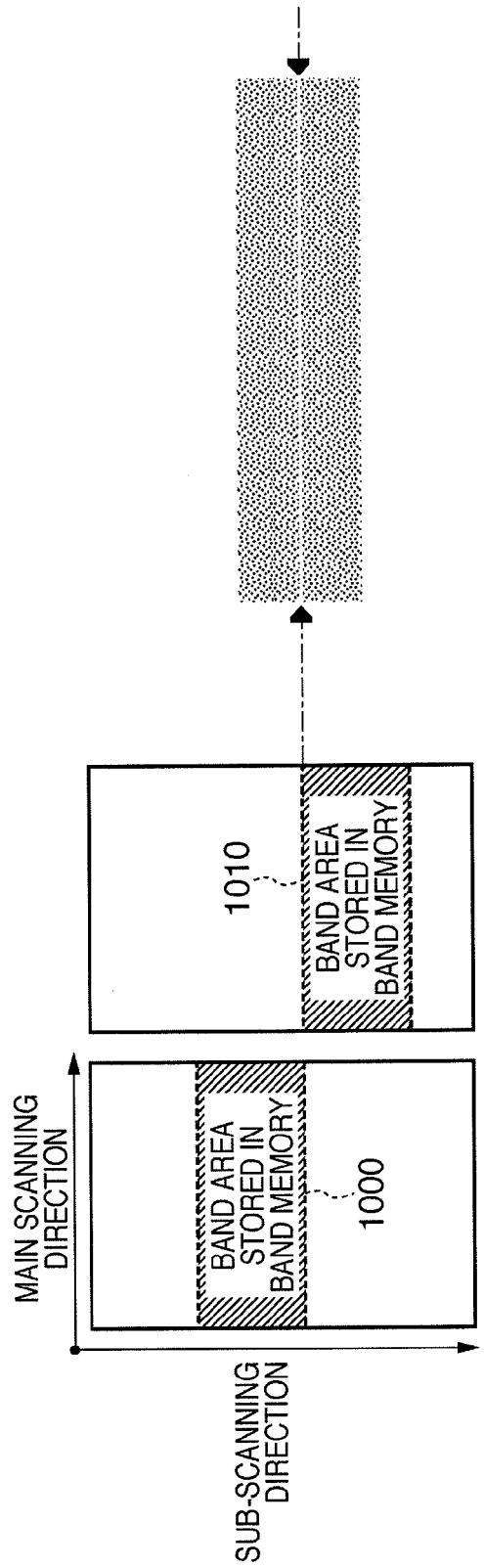

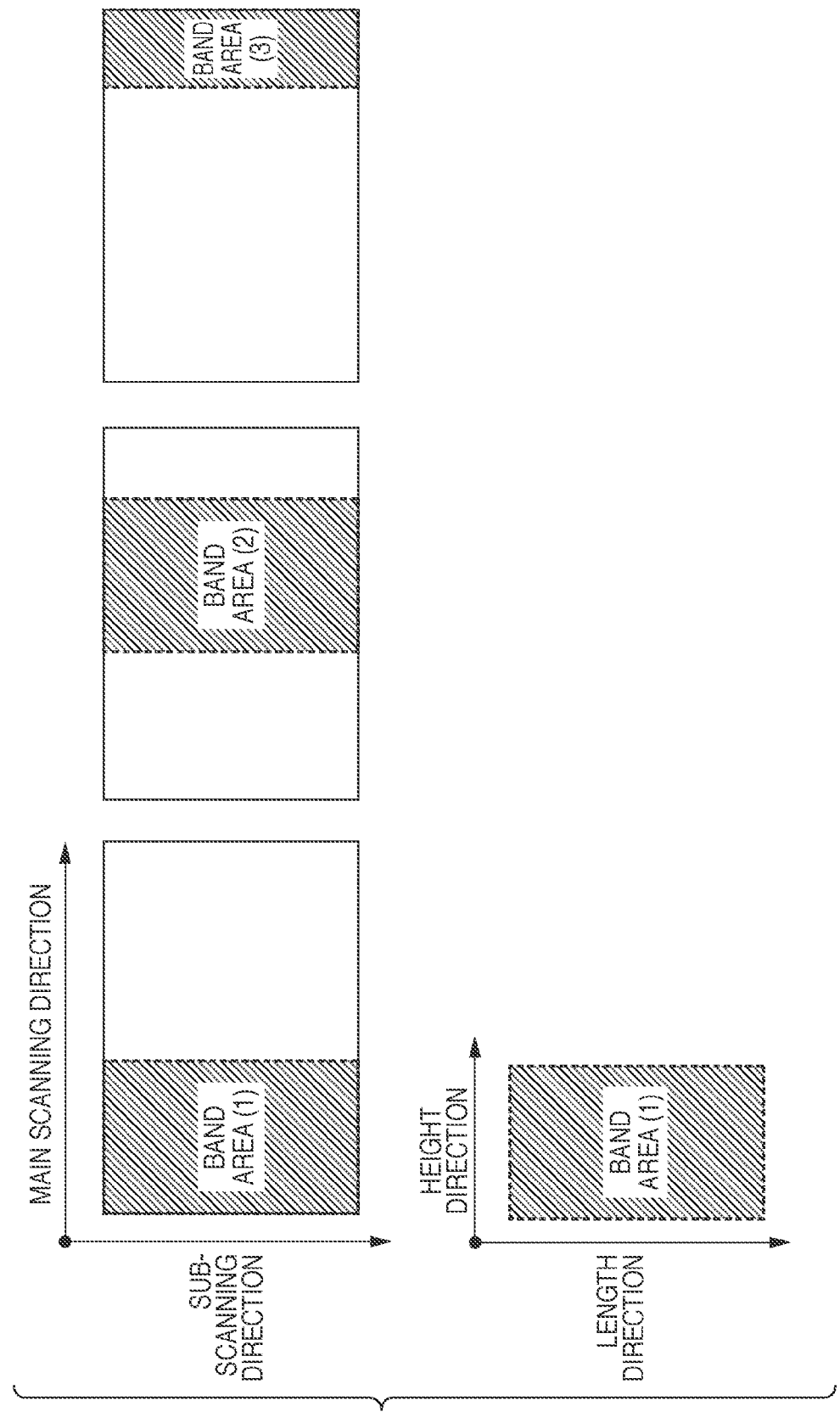

F I G. 12A

* INDICATES PIXEL OF INTEREST
NUMERICAL VALUES ARE WEIGHTING COEFFICIENTS

|   | 3/16 |
|---|------|
| * | 5/16 |
| 7/16 | 1/16 |

| 1/16 | 7/16 |
|------|------|
| 5/16 | *    |
| 3/16 |      |

| a | d |
|---|---|
| b | e |
| c |   |

IMAGE PROCESSING APPARATUS AND IMAGE PROCESSING METHOD

BACKGROUND OF THE INVENTION

1. Field of the Invention

The present invention relates to an image processing apparatus and an image processing method for dividing image data into a plurality of band areas and performing local image processing for each band area.

2. Description of the Related Art

Ordinarily local (neighborhood) image processing, such as spatial filtering, is performed on image data, when performing image forming based on digital image data. This local image processing is image processing in which some calculation is performed using all pixels included in a spatial filtering area that includes a pixel to be processed (referred to below as a pixel of interest).

As shown in FIG. 3, the local image processing, for example, is performed as successive processing in band units. Here, an example is described in which spatial filtering such as edge enhancement processing or blur processing is performed on the image data. Technology is known in which, for example as shown in FIG. 3, when performing spatial filtering on digital image data 300, the digital image data is divided into areas, and the local image processing is performed for each individual area (for example, see U.S. Pat. No. 6,587,158). In this technology, as indicated by reference numerals 301 to 304 in the upper portion of FIG. 3, the whole of one item of digital image data is divided into strips (rectangular strips) in a sub-scanning direction when reading (or when outputting) that digital image data, and various image processing is performed successively for each divided area. Below, the areas of these respective divided strips are referred to as band areas, a storage area where the band areas are developed is referred to as a band memory, an action of dividing an image is referred to as band division, and image processing performed on a band area is referred to as band processing. The band memory may be secured in any storage area of a system, but in the description given here, the band memory is secured within a main memory in order to simplify the description.

Following is a further description of ordinary band processing. First, a first band area 301 is developed in the band memory in the main memory, and image processing is performed. Next, a second band area 302 is developed by overwriting the band memory where the first band area 301 was developed, and image processing is performed. Further, a third band area 303 is developed by overwriting the band memory where the second band area 302 was developed, and image processing is performed. Finally, a fourth band area 304 is developed by overwriting the band memory where the third band area 303 was developed, and image processing is performed. As is seen from FIG. 3, the size in the longer side direction (length) is the width in the main scanning direction and therefore is the same for each of the band areas 301 to 304, but the size in the shorter side direction (height) is not necessarily the same for each of the band areas 301 to 304. In the example shown in FIG. 3, the first to third band areas 301 to 303 have the same height, but the fourth band area 304 is a portion of the entire digital image data that was not assigned to the first to third band areas, and therefore ordinarily does not have the same height as the other band areas. Consequently, the size of the storage area secured as the band memory in the main memory is determined according to the band area that has the largest size in the height direction (in the case of FIG. 3, the first to third band areas 301 to 303).

In the conventional local image processing described above, processing with reference to neighbor pixels of the pixel of interest is performed for the pixel of interest. Accordingly, in order to reliably perform image processing without a gap between band areas, a configuration is devised where portions of the band areas overlap each other on a border between band areas that are adjacent to each other.

Also, as shown in the lower portion of FIG. 3, each band area is expressed with a size of length direction×height direction, with the length direction being the longer side direction of the band area and the height direction being the shorter side direction. In this case, the length of the band areas 301 to 304 is the width in the main scanning direction of the digital image data, and the band height (height of the band area) is an arbitrary value.

Scanning of pixels in each band area can be controlled such that the scanning is performed in the height direction of the band area and not in the length direction. By performing scanning in the height direction, it is possible to prescribe the capacity of a delay memory that holds processed pixels necessary for local image processing at the size of a height that is less than the length of the respective band areas, and thus memory saving can be realized (for example, see Japanese Patent Laid-Open No. 2006-139606).

In the case of using both band processing and the above-described conventional local image processing such as spatial filtering, there also exist many types of local image processing that are not applicable merely by causing band areas to overlap. One example of such local image processing is error diffusion. Error diffusion is processing for converting multitone digital image data to digital image data of fewer tones, such as binary digital image data, and is one type of digital halftoning processing. Specifically, a pixel of interest is quantized to a quantization representative value based on a threshold, a quantization error that occurred at that time is diffused to tone values of neighbor pixels of the pixel of interest, the quantization error being the difference between the pixel of interest and the quantization representative value that occurred when performing quantization, and the respective tone values of these neighbor pixels are successively converted to digital halftoning data.

Thus, a feature of error diffusion is propagating the quantization error to the neighbor pixels, but when using both the above-described band processing and error diffusion, the quantization error is not correctly propagated at the band border, and so discontinuous deteriorated image quality unintentionally occurs in the digital halftoning data after error diffusion. Also, with error diffusion, a phenomenon called "sweep out" occurs in which dots are not formed until a quantization error is sufficiently accumulated. This "sweep out" is likely to occur at a band border, so that a problem also occurs in which a gap where a dot is not formed is visible as a discontinuous line or the like.

Here, with reference to FIG. 10, a description is given of an example of a problem that occurs when using both error diffusion and band processing. A case is considered in which after performing error diffusion in a band area 1000, error diffusion is performed in a band area 1010. As a result, sweep out occurs at the border between the band area 1000 and the band area 1010, so as indicated by the single-dotted chained line on the right side in FIG. 10, a gap where dots are not generated, unintentionally occurs continuously in the horizontal direction.

Also, in order to realize higher image quality in an image processing apparatus, recently there have been advances regarding increased colors and increased resolution of data to be processed, with a corresponding increase in the amount of data processed in image processing. There is naturally a desire to process this increased amount of data with as little cost as possible, and for example, there are demands to suppress the volume of memory used.

SUMMARY OF THE INVENTION

The present invention was made in order to address the problems described above, and provides an image processing apparatus having the following function and an image processing method. That is, when performing local image processing for each of band areas obtained by dividing image data, deterioration of image quality at a band border is suppressed, while realizing a smaller-scale circuit configuration.

According to an aspect of the present invention, an image processing apparatus for performing image processing for a plurality of band areas obtained by dividing image data is provided. The apparatus includes a dividing unit configured to divide the image data such that each of the plurality of band areas has an area overlapping an adjacent band area, and an image processing unit configured to perform the image processing for the band areas with respect to each of a plurality of planes that constitute the image data. A processing range within a band area used in the image processing by the image processing unit differs between at least two planes among the plurality of planes.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 10 shows an example of a problem that occurs when using both error diffusion and band processing.

FIG. 11 shows an example of dividing band areas in a main scanning direction of image data.

FIGS. 12A and 12B show exemplary coefficients of error diffusion and a circuit configuration in the first embodiment.

DESCRIPTION OF THE EMBODIMENTS

Embodiments of the present invention will now be described with reference to the drawings. It should be noted that the below embodiments do not limit the scope of the present invention set forth in the claims, and all combinations of features described in these embodiments are not necessarily essential to the present invention.

First Embodiment

Apparatus Configuration

Figure 1:
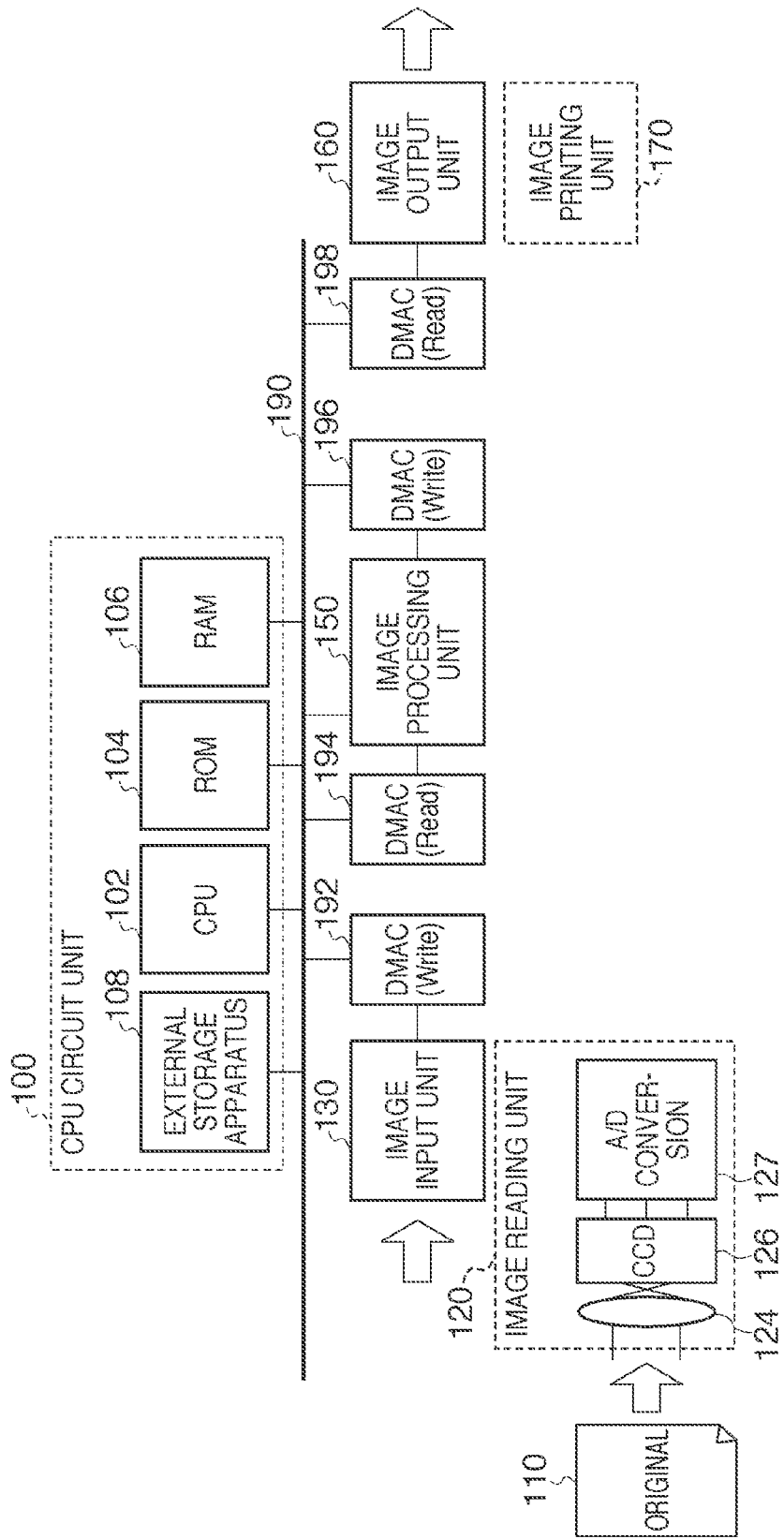
FIG. 1 is a block diagram that shows an exemplary overall configuration of an image processing apparatus in a first embodiment.

FIG. 1 is a block diagram that shows an example of the overall configuration of an image processing apparatus in the present embodiment. In FIG. 1, a CPU circuit unit 100 includes a CPU 102 for calculation and control, a ROM 104 that stores fixed data and programs, a RAM 106 used for temporarily saving data and loading programs, an external storage apparatus 108, and so forth. The CPU circuit unit 100 controls an image input unit 130, an image processing unit 150, an image output unit 160, and so forth, and performs central control of sequences of the image processing apparatus of the present embodiment. The external storage apparatus 108 is a storage medium such as a disk that stores parameters, programs, correction data, and so forth used by the image processing apparatus of the present embodiment. Data, programs, and so forth of the RAM 106 may be loaded from the external storage apparatus 108.

Any configuration where image data can be input is applicable as the image input unit 130; for example, a captured image may be input via a cable, or image data may be downloaded via the Internet or the like. In the description below, by way of example, an image reading unit 120 that reads an original 110 and generates image data of the original 110 is adopted as the image input unit 130. The image reading unit 120 has a lens 124, a CCD sensor 126, an analog signal processing unit 127, and so forth. In the image reading unit 120, image information of the original 110 is formed on the CCD sensor 126 via the lens 124, and converted to an analog electrical signal of R(Red), G(Green), and B(Blue). After conversion to an analog electrical signal, the image information is input to the analog signal processing unit 127, then correction and so forth are performed for each of the colors R, G, and B, and then analog/digital conversion (A/D conversion) of the signal is performed. Thus, a digitized full-color signal (referred to as a digital image signal) is generated.

The digital image signal generated by the image reading unit 120 is stored in the RAM 106 of the CPU circuit unit 100 via a shared bus 190 by a DMAC (Direct Memory Access Controller) 192 whose operation has been set in advance. The CPU 102 controls the DMAC 192.

Next, the CPU 102, by controlling a DMAC 194, reads out the digital image signal stored in the RAM 106 and inputs that digital image signal to the image processing unit 150. The image processing unit 150, with respect to the digital image signal that has been input, performs correction of individual difference of a reading element of a sensor device such as a scanner for example, color correction such as input gamma correction, and so forth, and normalizes the read image to create a digital image signal with a certain level. The digital image signal after processing is again stored in the RAM 106 by a DMAC 196 for which a write operation has been set in advance.

The image processing unit 150 also, with respect to the digital image signal that has been input, performs various image processing for printing such as input color correction, spatial filtering, color space conversion, density correction, and halftoning processing, thus creating a printable digital image signal. The printable digital image signal that has been created is again stored in the RAM 106 by the DMAC 196. Then, the CPU 102 controls a DMAC 198 to read out the image-processed digital image signal stored in the RAM 106 and output that digital image signal to an image printing unit 170. The image printing unit 170 is configured as a printer provided with a printing/output unit (not shown) such as a raster plotter using an inkjet head, a thermal head, or the like, for example, and the image printing unit 170 forms an image on a recording paper based on the digital image signal that has been input.

Structure of Image Data

The image that has been read by the image reading unit 120 in FIG. 1 is temporarily stored in the RAM 106, as described above. Ordinarily, the RAM 106 is often configured with an inexpensive DRAM, and in order to perform data reading/writing via DMACs as described above, it is possible to adopt a configuration in which data can be accessed in units such that reading/writing without a decrease in DRAM performance is possible. Here, with reference to FIG. 4, an exemplary data structure of a digital image signal and a storage method thereof in the RAM 106 will be described.

Figure 4:
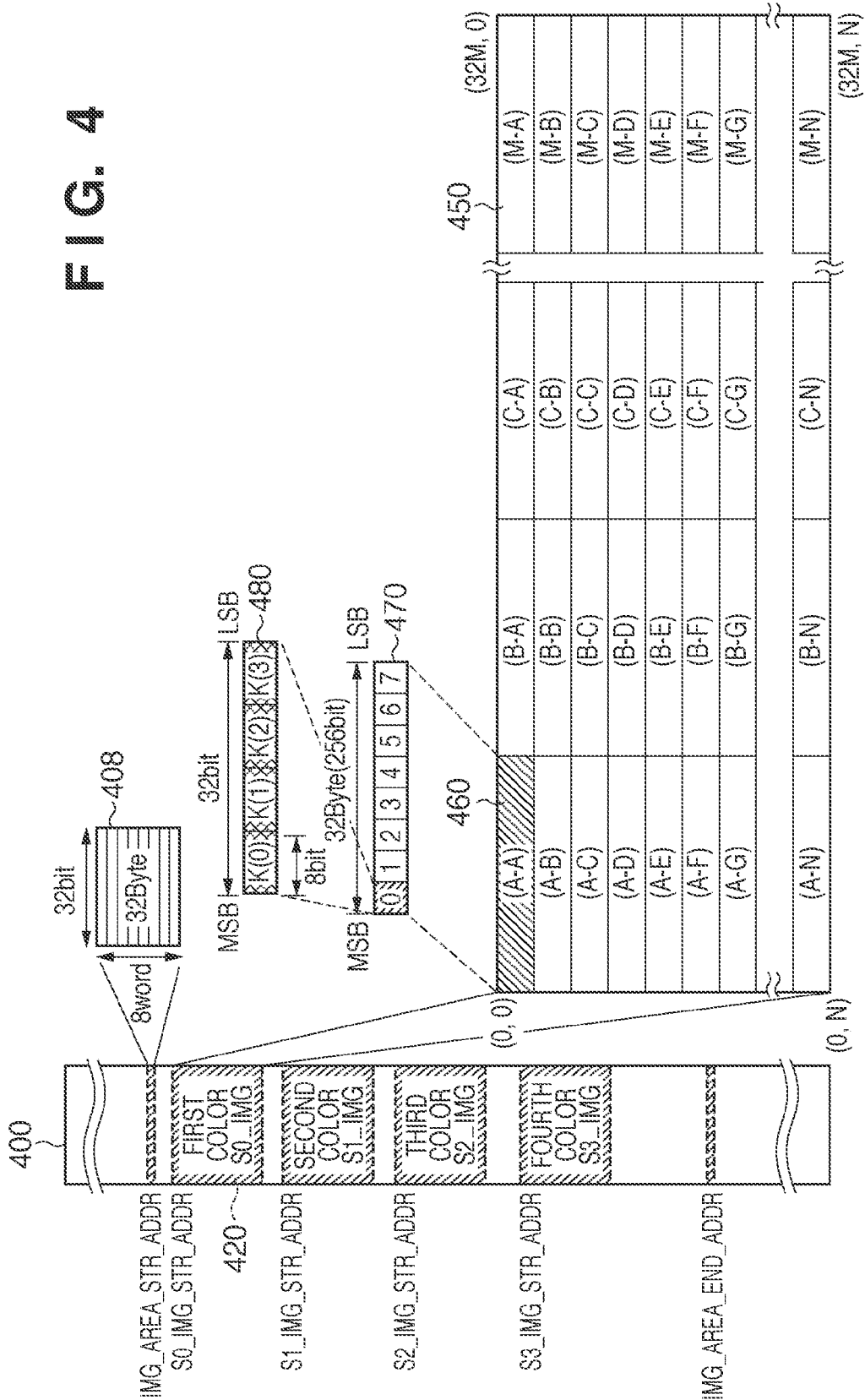
FIG. 4 shows an exemplary image data structure and an exemplary storage thereof in the first embodiment.

In FIG. 4, reference numeral 400 denotes the data structure of the digital image signal stored in the RAM 106. In FIG. 4, an area from IMG_AREA_STR_ADDR to IMG_AREA_END_ADDR is an area where data of one processing unit in the image processing is stored. In the example shown in FIG. 4, data of four colors from S0_IMG to S3_IMG is stored in the area within this processing unit. This data of four colors has been converted to data for a first color K (Black), a second color M (Magenta), a third color C (Cyan), and a fourth color Y (Yellow) by performing color space conversion, density correction, and so forth on an image that was read by the image reading unit 120. The data of these first to fourth colors is stored in the RAM 106 in a frame-sequential (planar format) manner. Such that the data can be accessed without a decrease in DRAM performance, a minimum unit (access unit) of data capacity stored for each color is 32 bytes of 32 bits×8 words, as indicated by reference numeral 408. Accordingly, the storage capacity of data from S0_IMG to S3_IMG is an integer multiple of 32 bytes.

Next is a detailed description of the structure of the data of each color. Reference numeral 450 denotes the image data (below, K data) of the first color K (Black) that has been stored in the area of S0_IMG 420. Reference numeral 460 denotes the above-described 32 bytes of access unit data within the K data 450, and in this example, there are M×N items of the access unit data 460 within the K data 450. Eight items of data are packed within the access unit data 460 as denoted by reference numeral 470, and in one of those items of data, four items (four pixels) of 8-bit K (Black) data are packed as denoted by reference numeral 480. Accordingly, the K data 450 indicated by a thick-lined frame in FIG. 4 has a size of 8×4×M×N pixels.

By the CPU 102 activating the DMAC 194, the digital image signal having the above-described data structure is read out from the RAM 106, and is input to the image processing unit 150.

Figure 2:
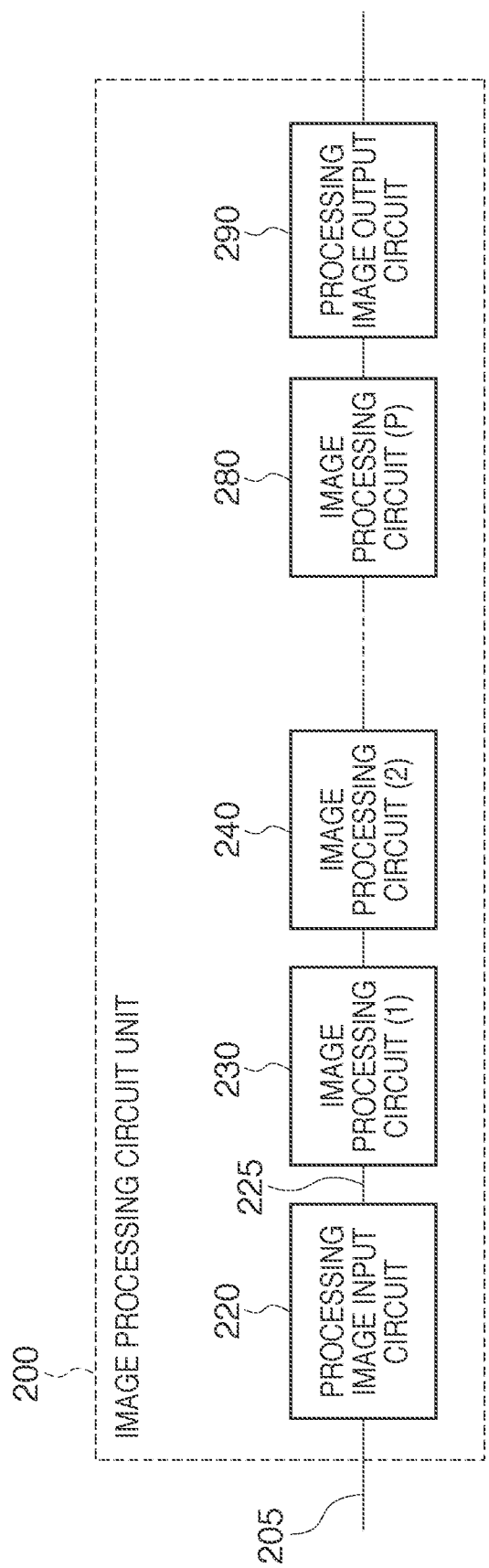
FIG. 2 is a block diagram that shows an exemplary configuration of an image processing unit in the first embodiment.

Here, FIG. 2 shows the configuration of an image processing circuit unit 200 that is an example of the main circuit configuration possessed by the image processing unit 150 of the present embodiment. First, a processing image input circuit 220 receives various data via a bus 205, and when the packed digital image signal shown in FIG. 4 has been received, the packed digital image signal is unpacked to a digital image signal of pixel units. The unpacked digital image signal is forwarded to subsequent image processing circuits (1) 230, (2) 240, . . . , (P) 280, and various correction processes or image processing is performed. Then, in a processing image output circuit 290, a digital image signal is created that has been re-packed to data in the 32-byte units shown in FIG. 4, and written back to the RAM 106 as a corrected (image-processed) digital image signal via the DMAC 196. With the image processing circuits (1) 230 to (P) 280, in any of those image processing circuits, image processing such as input color correction, spatial filtering, color space conversion, density correction, and halftoning processing are respectively performed. In these image processing circuits (1) 230 to (P) 280, for example, processing for one color (one plane) may be performed, or processing for a set of several colors such as RGB or CMYK may be performed.

Band Height Setting Processing

Figure 3:
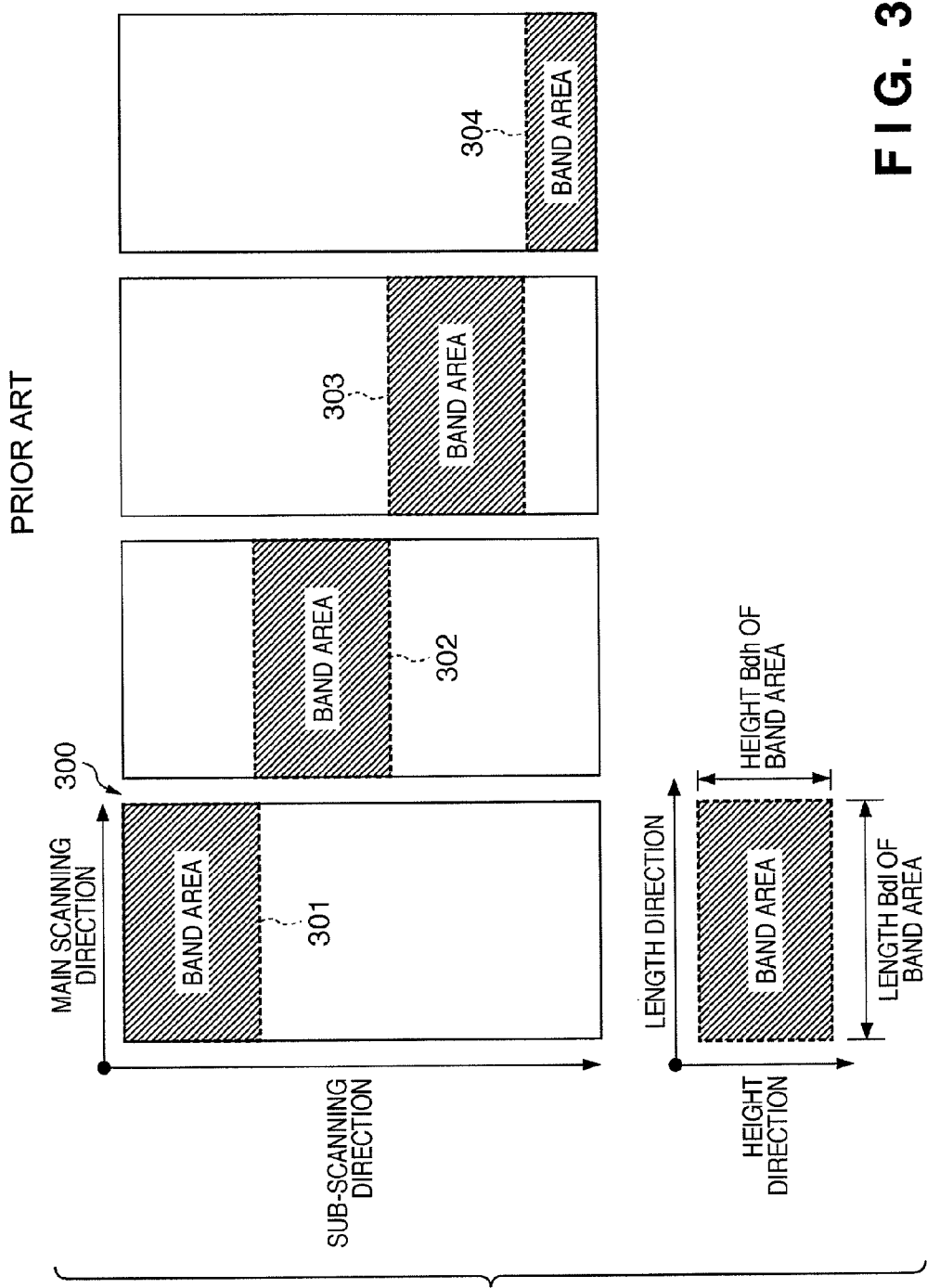
FIG. 3 shows an example of ordinary band processing.

In the present embodiment, image processing is successively performed for each of a plurality of band areas obtained by dividing image data in a fixed direction. At this time, image processing specialized for band processing is performed using a band area coordinate system that differs from a digital image data coordinate system (main scanning direction×sub-scanning direction). The band area coordinate system is expressed by a length direction×a height direction that correspond to a longer side direction×a shorter side direction of the band area, as shown in the lower portion of FIG. 3 described above. As described above, the length direction of the band area corresponds to the size of the image data in the main scanning direction or the sub-scanning direction, but the size of the band area in the height direction can be set arbitrarily according to a division size. Although described in detail later, the size in the height direction of the band area can be set to a smaller size than the size in the length direction.

Below, processing to set the band height in the band area coordinate system of the present embodiment will be described with reference to FIG. 5. In the present embodiment, in order to reduce the deterioration of image quality due to using both the error diffusion and the band processing as described above, the processing areas within the band area where error diffusion is performed differ for each color (each plane), and the processing border of each band is caused to differ for each color.

Figure 5:
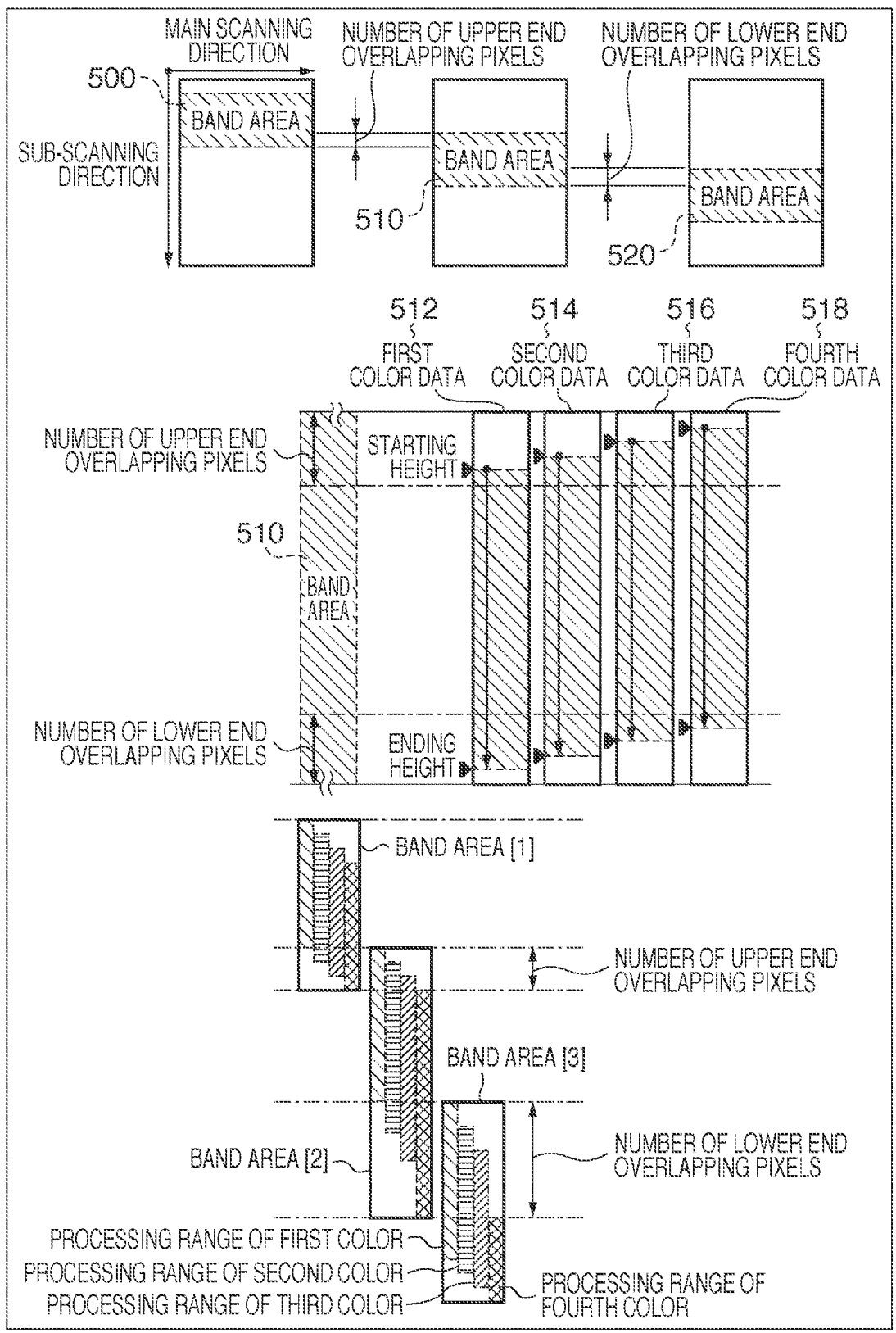
FIG. 5 shows exemplary band height settings in the first embodiment.

FIG. 5 shows an example of performing a sequence of band processing operations in which a band area is divided in the sub-scanning direction of the image data, then a band area 500 is processed, then a band area 510 is processed, and then a band area 520 is processed. The middle portion of FIG. 5 shows exemplary band height settings for the band area 510 in this sequence of band processing operations. First color data 512 is data of a K plane, and likewise, second color data 514 is data of an M plane, third color data 516 is data of a C plane, and fourth color data 518 is data of a Y plane. In the data from the first color data 512 to the fourth color data 518 in the band area 510, it is seen that a processing range of error diffusion indicated by "starting height" to "ending height" is set so as to differ for each color data.

In the band area 510, the height of the band area 510 is set such that an overlapping area that overlaps an adjacent band area encompasses a border of the entire application range (the range surrounded by diagonal lines in FIG. 5) of the first color data 512 to the fourth color data 518. Below, the numbers of pixels in the overlapping area at the upper end and the lower end respectively of the band area are referred to as the number of upper end overlapping pixels and the number of lower end overlapping pixels.

Here, the lower portion of FIG. 5 shows a relationship between respective band areas and the processing range and the processing border for each color thereof, in a sequence of a plurality of instances of band processing. According to FIG. 5, each band area overlaps with the preceding and subsequent band areas, and that overlapping area is understood to be determined according to the processing range of each color in that band. That is, in the upper end portion and the lower end portion respectively in the band area, the area that includes the band borders of all colors is set as the overlapping area indicated by the number of upper end overlapping pixels and the number of lower end overlapping pixels.

The data of these overlapping areas, as is seen from FIG. 5, is obtained in an overlapping manner from the RAM 106, and is input to the image processing circuit unit 200.

The overlapping area (the number of overlapping pixels) between band areas that is set in the present embodiment can be any size, as long as it is possible to perform supplementation such that between vertically continuous band areas the processing range of each color is continuous.

In the present embodiment, by providing an overlapping area between band areas as described above, it is possible to reliably perform local image processing (for example, error diffusion) referring to neighbor pixels for a pixel of interest in each band without a gap between band areas. At this time, the processing range of each color in each band is made to differ, that is, the band height that is the actual subject of processing is made to differ for each color. Thus, because the deterioration of image quality due to discontinuity of error propagation, sweep out, and so forth, which are more likely to occur at a band border, occur at different positions for each color, this deterioration of image quality is more difficult to visually recognize for the image as a whole.

If the settings are made such that the processing range within the band area differs between at least two colors (between two planes) among the plurality of colors (plurality of planes) that constitute the image data, it is possible to reduce the deterioration of image quality that can be visually recognized at the band border.

Image Data Reading Processing

Figure 6:
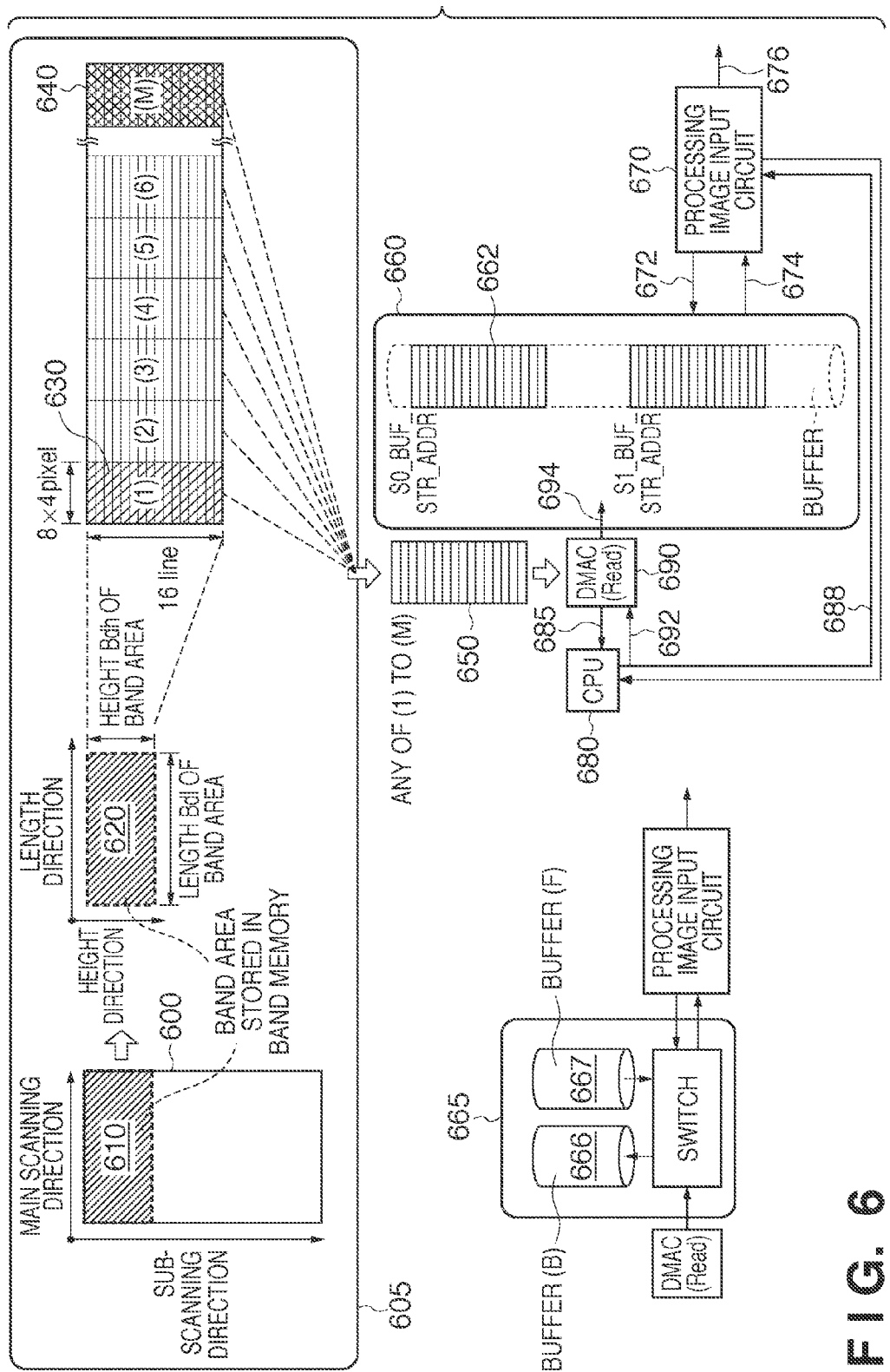
FIG. 6 shows an example of an image data read-in operation in the first embodiment.

The following is a description of processing to read in digital image data of the present embodiment constituted as described above from the RAM 106 into the processing image input circuit 220, with reference to FIG. 6. A portion surrounded by a dotted line 605 schematically indicates the digital image data stored in the RAM 106. Within the dotted line 605, reference numeral 600 denotes the entire digital image data, and from the entire digital image data 600, a band area 610 having a band height that has been set as described with reference to FIG. 5 is extracted, and image processing is performed. The band area 610 on which processing is to be performed has a configuration as indicated by reference numerals 620 to 640 to the right side of the band area 610. That is, in the band area 620 (610), a height Bdh in the band area coordinate system is 16 lines (16 pixels), and a length Bdl is 8×4×M pixels as indicated by reference numerals 630 to 640. In the band area 620, reference numerals 630 to 640 denote items of access unit data (1) to (M) described later, and the size of each of those items of data is 16 lines×(8×4) pixels.

When reading out this band area 610 from the RAM 106, first, a CPU 680 shown below the dotted line 605 sets read-out information of the band area 610 from the RAM 106 to a DMAC 690 via a shared bus 685. The CPU 680 corresponds to the CPU 102 shown in FIG. 1, and the DMAC 690 likewise corresponds to the DMAC 194. Here, the read-out information set to the DMAC 690 includes information regarding a start address of the band area 610 in the RAM 106, a continuous read-out amount that indicates how many times to continuously read out data in 32-byte units, an increment address, and a number of repetitions. In the example shown in FIG. 6, the continuous read-out amount is one time (32 bytes), the increment address is 32 bytes×M, which is the data amount of one line, and the number of repetitions is 16 times.

Also, as shown in FIG. 6, between the DMAC 690 and a processing image input circuit 670 (corresponding to the processing image input circuit 220 shown in FIG. 2), there is a shared buffer 660 whereby data access is possible from both modules. Consequently, the CPU 680, via the shared bus 685 to the DMAC 690, instructs also a write start address of the shared buffer 660 that is a write destination of acquired data. In the example shown in FIG. 6, written data is temporarily saved to an area 662 in the shared buffer 660, so the write start address for the shared buffer 660 is a start address S0_BUF_STR_ADDR of the area 662.

The DMAC 690 receives the instruction from the CPU 680, and with respect to one color among the image data that has been saved in the RAM 106, reads out any of the items of access unit data (1) 630 to (M) 640 in the band area 620. Here, the access unit data read out is denoted by reference numeral 650. Next, the DMAC 690 stores the acquired data 650 in the area 662 of the shared buffer 660 via a shared bus 694, and then notifies the CPU 680 that transfer has ended with an interrupt signal 692.

Next, the CPU 680 sets the read-out information of the shared buffer 660 to the processing image input circuit 670 via a shared bus 688 and activates the processing image input circuit 670. Here, the read-out information is information regarding each of a band area height described later, a starting height and an ending height of the processed color in this band area, an image data format, the read-out start address S0_BUF_STR_ADDR of the shared buffer, and so forth.

The processing image input circuit 670, by reading and accessing the shared buffer 660 via a control signal 672, such as a chip selection signal or an address signal, acquires read data 674. Then, pixel data (a pixel value) of one color of one pixel unit is selected from the acquired read data 674, and the pixel data is output to an internal bus 676 (corresponding to an internal bus 225 shown in FIG. 2) of the image processing circuit unit 200.

Thus, in the present embodiment, pixels of interest are successively determined by scanning pixels orthogonal to the length direction of the band area. Ordinarily, the length direction of the band area is the same as the main scanning direction of the image data when reading (or when outputting). Accordingly, the scanning direction in a band in the present embodiment is the sub-scanning direction when reading (the shorter side direction of the band area, referred to below as the height direction), orthogonal to the main scanning direction when reading (the longer side direction of the band area). Scanning within the band in the direction orthogonal to the main scanning direction when reading the band area in this way is referred to below as cross band processing.

The shared buffer 660, as denoted by reference numeral 665 in FIG. 6, may also be configured with two or more buffers 666 and 667. In the example described above, one buffer is shared by the DMAC 690 and the processing image input circuit 670, so it is necessary to perform operations in a time-sharing fashion, but by adopting a configuration with a plurality of buffers, processing can be accelerated. That is, while the processing image input circuit 670 is acquiring the pixel data from the shared buffer 667, the DMAC 690 can transfer data from the RAM 106 to the shared buffer 666, so the processing of the DMAC 690 and the processing image input circuit 670 can be performed in parallel.

A configuration is acceptable in which, when performing the image processing of the band area 620 (610) of the digital image data, processing by the DMAC 690 is repeated with respect to each of the items of access unit data (1) 630 to (M) 640 in the band area 620. Moreover, the same processing may be repeated with respect to the first color to the fourth color.

Error Diffusion

The following is a detailed description of the error diffusion in the present embodiment. The left portion of FIG. 12A shows an example of error diffusion coefficients used for error diffusion in the present embodiment. In this example, an error distribution is shown in which pixels of interest indicated by * are diffused in pixels within a neighborhood area. The center portion of FIG. 12A shows a filter used when calculating an error diffused from a neighbor pixel for a pixel of interest *, when error diffusion has been performed using the above error diffusion coefficients. This filter has a form that is point-symmetrical to the above error diffusion coefficients. In the right portion of FIG. 12A, where a pixel of interest is represented by e, positional relationships of pixels referred to when executing error diffusion for the pixel of interest e are denoted by letters a to d, and the errors of the pixels at positions a to d are referred to when performing processing of the pixel of interest e.

Figure 12B:
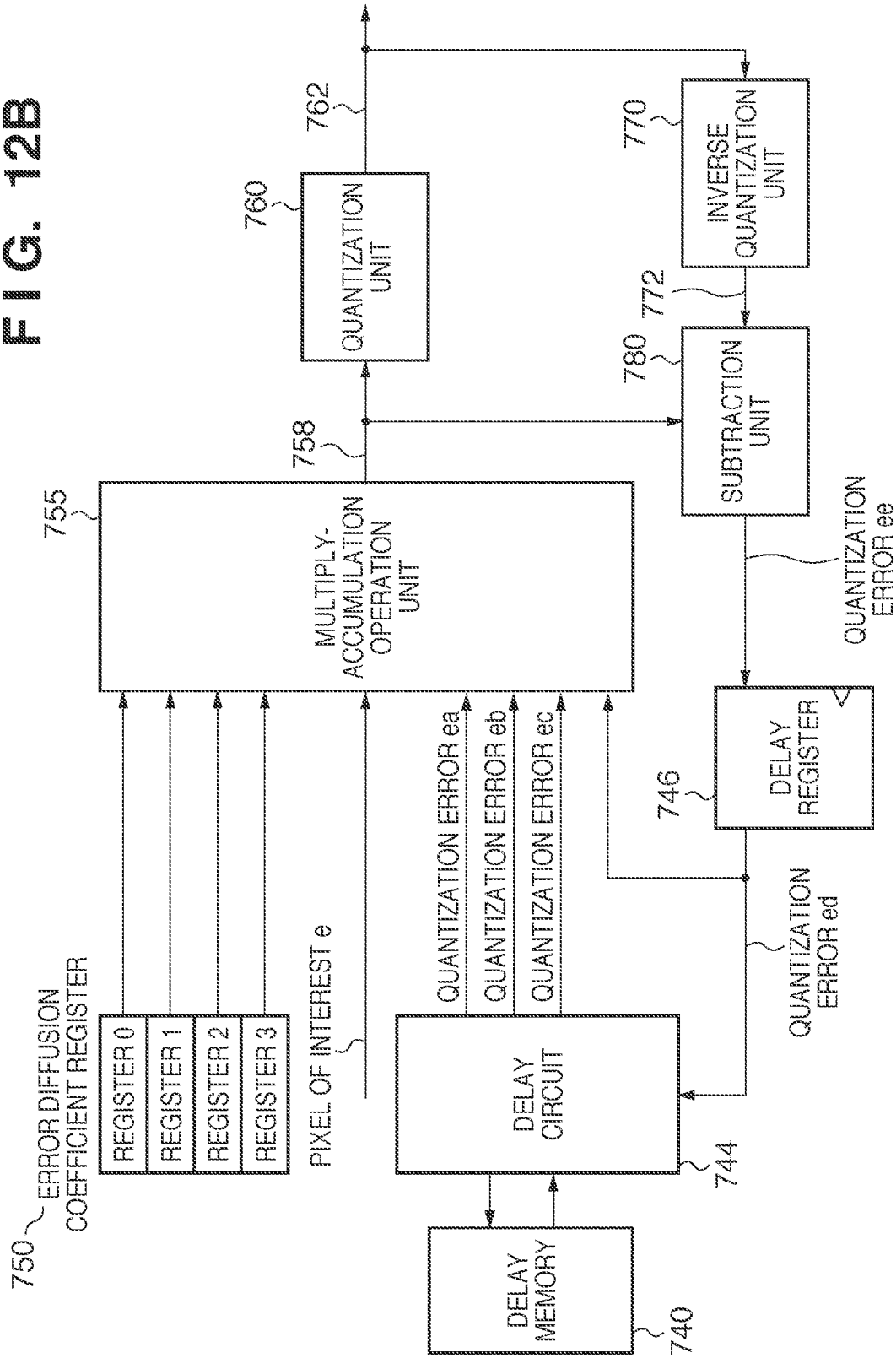

FIG. 12B shows an exemplary configuration of an error diffusion circuit in the present embodiment. This error diffusion circuit, as described above, is any of the image processing circuits (1) 230 to (P) 280 in the image processing circuit unit 200.

FIG. 12B shows a state in which the pixel of interest e has been input, and in order to process this pixel of interest e, quantization errors ea to ed obtained as calculation results when processing the above pixel positions a to d are necessary. Here, the quantization errors ea, eb, and ec of the pixel positions a, b, and c are already stored in a delay memory 740. Also, the quantization error ed of the pixel position d that was processed immediately prior to the pixel of interest e is already stored in a delay register 746. The quantization errors ea, eb, and ec are extracted from the delay memory 740 via a delay circuit 744, and input to a multiply-accumulation operation unit 755. In addition, the quantization error ed is also input from the delay register 746 to the multiply-accumulation operation unit 755. Also, four types of error diffusion coefficients stored in an error diffusion coefficient register 750 are input to the multiply-accumulation operation unit 755.

In the multiply-accumulation operation unit 755, for each of the quantization errors ea to ed, weighting by the corresponding error diffusion coefficient is performed, and the sum of the value after weighting and the pixel of interest value e is output as a multiply-accumulation operation result 758. A quantization unit 760 quantizes the multiply-accumulation operation result 758 from the multiply-accumulation operation unit 755 to a predetermined quantization representative value based on a predetermined threshold, and outputs a quantization result 762. An inverse quantization unit 770 inverse-quantizes the quantization result 762 from the quantization unit 760 to return the quantization result 762 to the quantization representative value, and outputs this as an inverse-quantization result 772. In a subtraction unit 780, the difference between the multiply-accumulation operation result 758 output from the multiply-accumulation operation unit 755 and the inverse-quantization result 772 output from the inverse quantization unit 770 is calculated, and output as a quantization error ee.

The quantization error ee that has been output from the subtraction unit 780 is stored in the delay register 746, and is used when processing the next pixel. Also, the quantization error ed that was used in order to process the pixel of interest e is stored in the delay memory 740 via the delay circuit 744, and is used when processing a pixel of the next line in the length direction of the band area.

Figure 7:
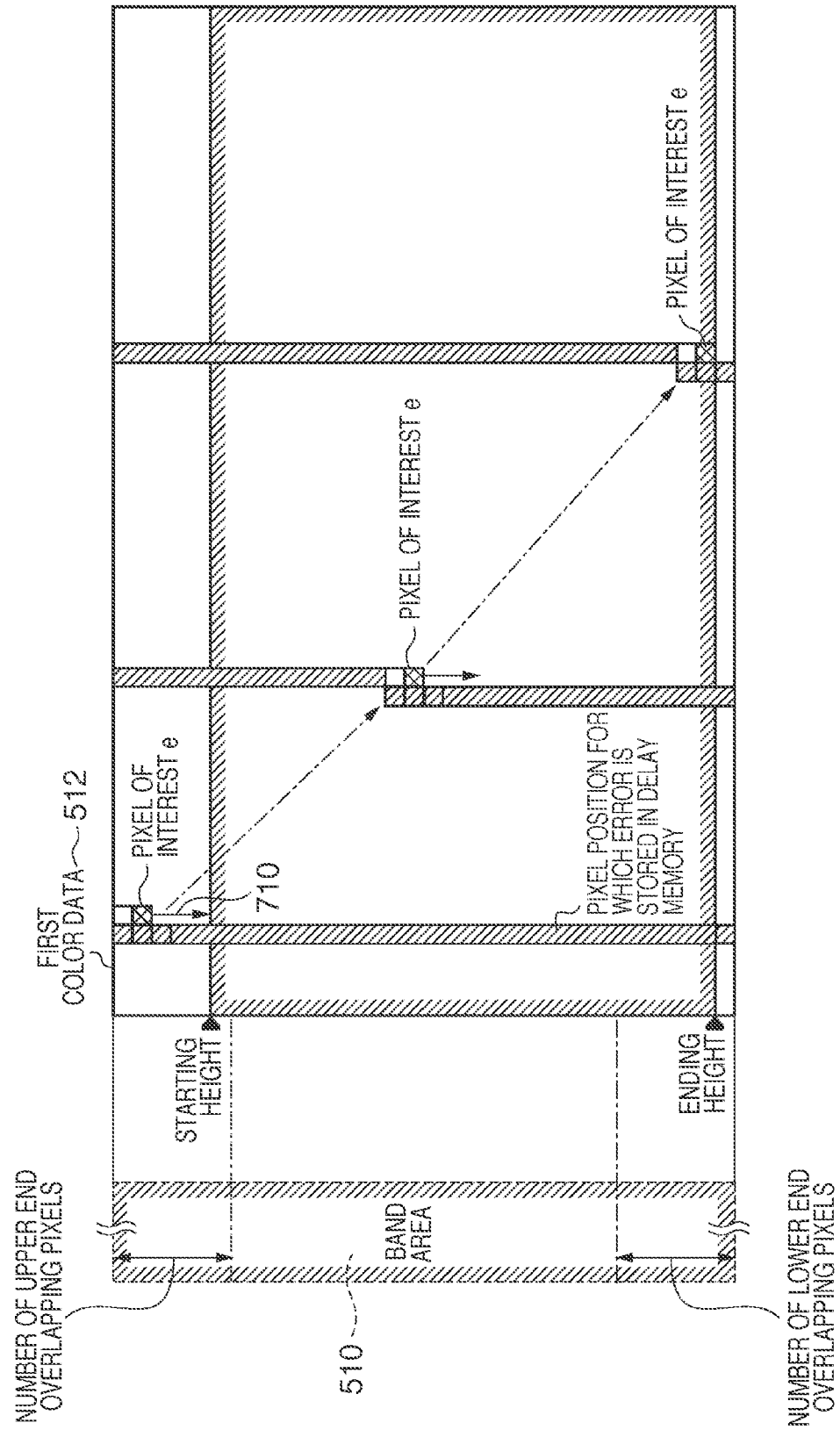
FIG. 7 shows an example of use of a delay memory when performing error diffusion in the first embodiment.

FIG. 7 shows how quantization errors are stored in the delay memory 740 when error diffusion is performed by the error diffusion circuit shown in FIG. 12B. In the present embodiment, cross band processing is performed, so the pixel scanning direction when processing the band area 510 is the orthogonal direction (height direction) to the length direction of the band area, as indicated by arrow 710 in FIG. 7. In the band area 510, first scanning of an upper left pixel as the pixel of interest e is started, and scanning of a 1-pixel column in the height direction is performed to determine the pixel of interest e. When processing of the pixel at the lower end in this pixel column ends, the pixel of interest e is shifted by one pixel in the length direction of the band area, and scanning in the height direction is performed from the pixel at the upper end to the pixel at the lower end in the new pixel column in the band area 510. This sort of scanning in the height direction is repeated until processing finishes for all pixels in the band area.

FIG. 7 shows, in the error diffusion for the first color data 512 shown in FIG. 5, the relationship between the pixel of interest e during that scanning and the pixel position held in the delay memory 740 during processing of the pixel of interest e. As described above, in the present embodiment cross band processing is performed, so in FIG. 7 the pixel of interest e shifts sequentially in the height direction from the upper left of the band area, and examples are shown of a case when the pixel of interest e is positioned at the upper end of the band area, a case when the pixel of interest e is positioned at the center of the band area, and a case when the pixel of interest e is positioned at the lower end of the band area. According to FIG. 7, as indicated by a diagonal line in FIG. 7, the quantization error obtained by the instance of scanning prior to scanning for the pixel of interest e and the quantization error obtained during the present scanning are held in the delay memory 740. In the delay memory 740, the quantization error obtained by the prior instance of scanning is successively replaced by the quantization error obtained by the present instance of scanning.

According to FIG. 7, it is seen that the number of pixels for which the delay memory 740 holds a quantization error depends on the band height. In other words, a configuration is acceptable if the delay memory 740 is capable of holding at least calculation results for a number of pixels corresponding to the band height. The band height that corresponds to the shorter side direction of the band area is smaller than the size in the longer side direction, that is, the band length that corresponds to the width of the recording paper on which the entire image is ordinarily formed, so the number of pixels to be held by the delay memory 740 can be reduced. Accordingly, in the error diffusion of the present embodiment in which scanning is performed in the band height direction, in comparison to a case of performing scanning in the band length direction, the capacity of the delay memory 740 in the error diffusion circuit can be reduced, and thus memory saving can be realized.

The capacity of the delay memory 740 fluctuates according to the form of the filter used for error diffusion. That is, for the delay memory 740, a capacity is necessary such that it is possible to hold calculation results of a number of pixels obtained by multiplying a number of scan lines scanned prior to the scan line of the pixel of interest in the filter by a number of pixels corresponding to the band height.

As the range in which the error diffusion is actually performed, a range from the starting height to the ending height of the application area in the first color data 512 is acceptable, but in FIG. 7, an example is shown where error diffusion is performed on the entire band area. However, in this case, when writing the error diffusion results to the RAM 106, the results of the range from the starting height to the ending height of the first color data 512 shown in FIG. 7 are written.

As described above, according to the present embodiment, the deterioration of image quality that occurs when using both error diffusion and band processing can be reduced by causing the processing border to differ for each color (plane). Also, by performing scanning in the band during error diffusion in the band height direction and not in the band length direction, the number of quantization errors (number of pixels) to be held is reduced, so a reduction in circuit size due to reducing the delay memory capacity can be attained.

In the present embodiment, an example is described in which error diffusion and band processing are both used, but the present invention is also applicable in a case when local (neighborhood) image processing such as spatial filtering and band processing are both used.

Second Embodiment

The following is a description of a second embodiment according to the present invention. The configuration of the image processing apparatus in the second embodiment is the same as in the first embodiment, so a description thereof is omitted here.

In the above first embodiment, an example is described in which when using both error diffusion and band processing, the deterioration of image quality due to using both error diffusion and band processing is reduced by causing the processing range to differ for each color (plane) in the band area. However, the deterioration of image quality occurs not only when using both error diffusion and band processing, but also when using band processing along with correction of an image that has been read with a sensor device such as a scanner. The cause of this is that ordinarily in a sensor device, the positional relationship of sensors corresponding to each color (R, G, and B) is fixed, so offset unintentionally occurs in the read digital image data corresponding to each color. In the second embodiment, an example is described in which, also when performing image processing such as MTF correction on the image data of each color that has been read by the sensor device, good image processing results are obtained by causing the processing range to differ for each color (plane) in the band area.

Figure 8:
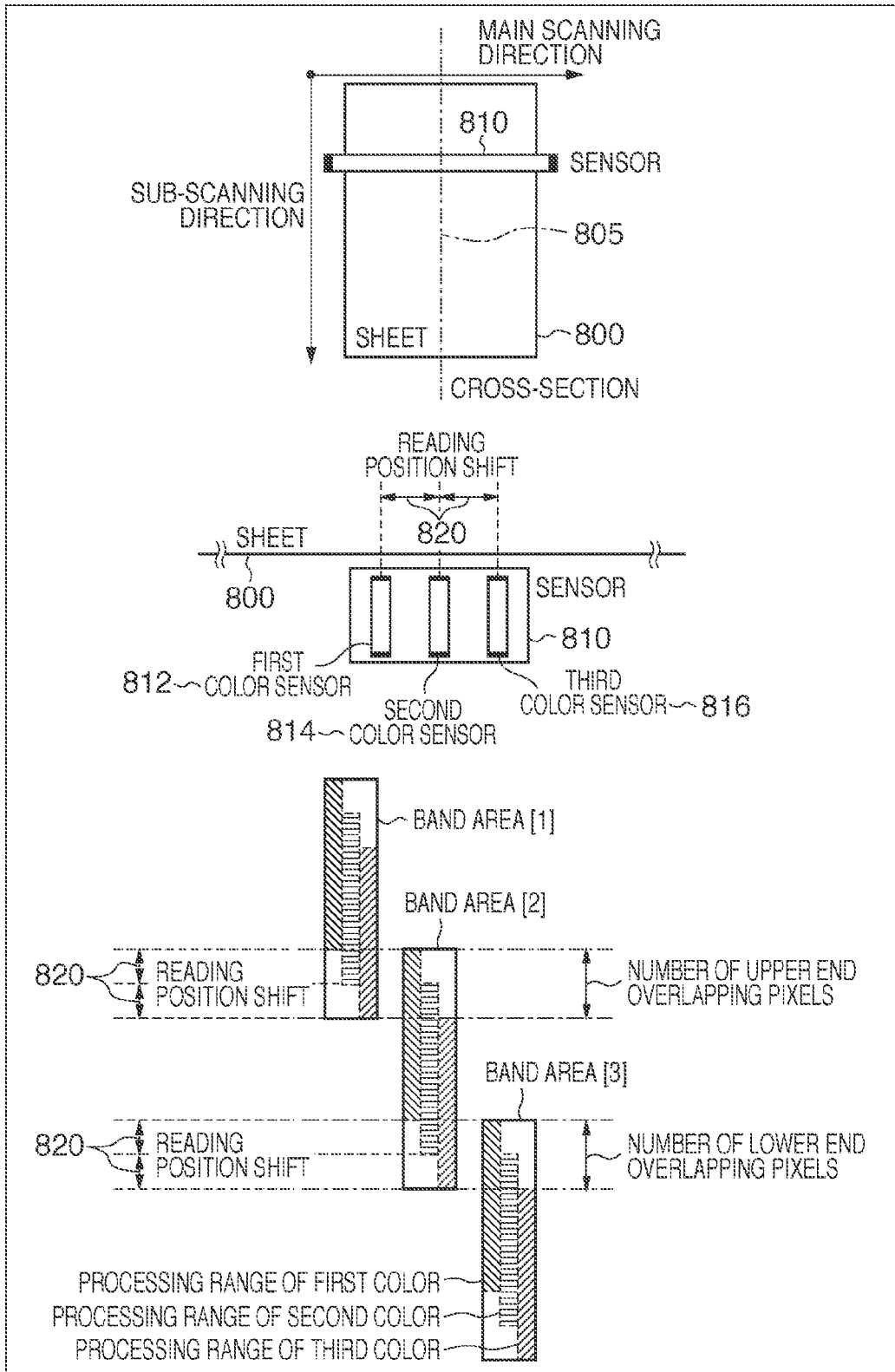
FIG. 8 shows an exemplary relationship between a configuration of reading sensors and band areas in a second embodiment.

The upper portion of FIG. 8 shows a state in which a scanner 810 is performing a reading operation on a sheet 800. Here, the scanner 810 has a line shape longer than the width (paper width) in the main scanning direction of a sheet 800, and is capable of reading one line of image data at once. Accordingly, by the scanner 810 scanning or by the sheet 800 being fed in the sub-scanning direction of the sheet 800, it is possible to capture an image of the entire sheet 800.

In order to further describe the configuration of the scanner 810, the middle portion of FIG. 8 shows an enlarged view of a cross-section 805 of the sheet 800. The scanner 810 is configured with three line-shaped sensors 812, 814, and 816, with each sensor having a specific wavelength sensitivity corresponding respectively to a first color, a second color, and a third color, and each sensor reading image data of the corresponding color (plane). The respective sensors 812, 814, and 816 that constitute the scanner 810 cannot be physically disposed at the same position, so in the reading position of each sensor (each color) at a particular time, there is always a shift of several pixels, shown as a reading position shift 820 in FIG. 8. Accordingly, when performing correction of read image data of the band area from one particular time to another particular time, it is necessary to consider that amount of that shift.

Consequently, in the second embodiment, the height of the band area is set in order to eliminate the influence of the reading position shift 820 of each color. The lower portion of FIG. 8 shows the relationship between band areas and processing areas in the second embodiment. According to FIG. 8, it is seen that the band area height is set such that the processing range of each color in each band area shifts by the same amount as the reading position shift 820. Each band area has an overlapping area like in the above first embodiment, and as described with reference to FIG. 5, the overlapping area is determined according to the processing range of each color in the band. That is, according to the second embodiment, the number of upper end overlapping pixels and the number of lower end overlapping pixels, and the processing range of each color (plane), are determined according to the reading position shift 820 of each color in the above scanner 810.

When the band area height in the read image data is set as described above, thereafter, the same as in the above first embodiment, it is possible to perform image correction such as MTF correction on the read image data by performing band processing. At this time, the reading position shift 820 of each color in the scanner 810 is absorbed by the overlap of the band area, so appropriate processing results are obtained.

According to the second embodiment, as described above, when, for each plane, there is a shift in the reading position of a sensor device, the band area height is set according to the amount of position shift. Thus, while realizing memory saving of the delay memory by band processing as in the above first embodiment, it is possible to realize appropriate correction processing by band processing.

Exemplary Modification

Figure 9:
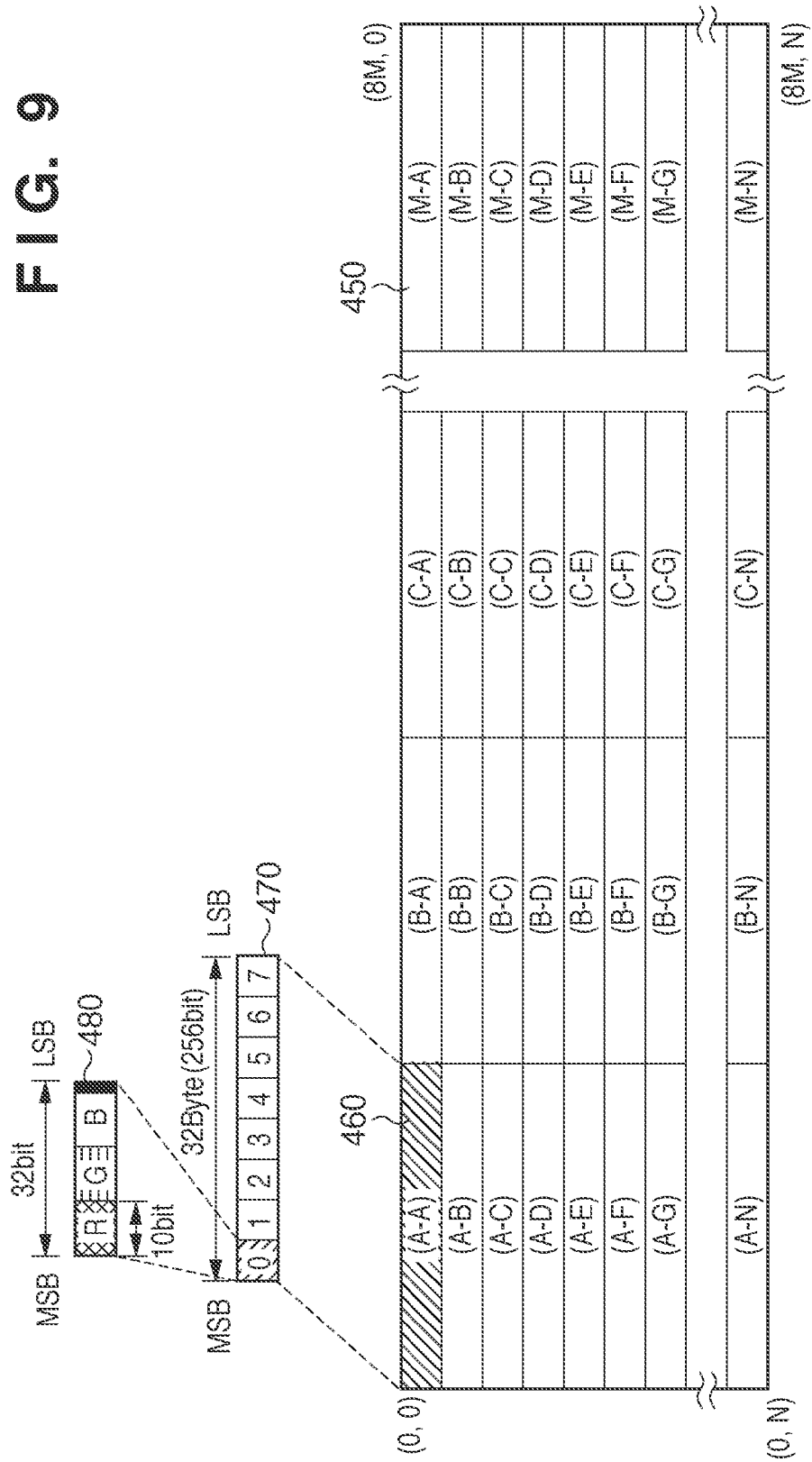
FIG. 9 shows an exemplary image data structure in a third embodiment.

In the above first embodiment, an example is described in which the digital image signal stored in the RAM 106 has a frame-sequential data structure as shown in FIG. 4, but the present invention is also applicable when that digital image signal has a dot-sequential (chunky format) data structure. Here, an exemplary dot-sequential data structure to be processed is shown in FIG. 9, with reference numeral 450 denoting all image data. As in FIG. 4, reference numeral 460 denotes 32-byte access unit data, and as denoted by reference numeral 470, eight pixels of data are packed within the access unit data 460. As denoted by reference numeral 480, 10 bits of data for each of R (red), G (green), and B (blue) is packed in one pixel of the data 470. In order to enable data access in 32-byte units using a DRAM, as the one pixel of data 480, 2-bit null data is added to the total 30 bits of R, G, B data, resulting in a total of 32 bits. Accordingly, the total image data 450 indicated by a thick-lined frame in FIG. 9 has a size of 8M×N pixels. Thus, access in 32-byte units is possible also for image data having a dot-sequential configuration as shown in FIG. 9, so the band processing in the above first and second embodiments can be executed.

Also, the band area length direction can be set to match the sub-scanning direction of the image data. For example, as shown in the upper portion of FIG. 11, when band areas have been divided in the main scanning direction of the image data, the length direction of each band area becomes the sub-scanning direction of the image data, as shown in the lower portion of FIG. 11. In this case, by setting the area of the pixels included in the 32-byte access unit data 460 in the image data structure shown in FIG. 9 to one pixel in the main scanning direction and eight pixels in the sub-scanning direction, it is possible to execute the band processing in the above first and second embodiments.

Also, in the above first and second embodiments, it is possible to change the band height of each color, that is, the size of the processing area of each color, so optimal image processing for each color can be performed.

Also, in the image processing in the above first and second embodiments, there is not a dependency between band areas; the image processing can be executed independently for each band area. Accordingly, when band heights have been established in advance for a plurality of band areas, it is not necessary to perform image processing successively for each band area, so image processing can be accelerated by performing distributed parallel processing for each band area. Further, by developing the plurality of band areas for which the band height has been established in a plurality of processors and a memory possessed by these processors, it is of course possible in each processor to execute error diffusion and image processing such as sensor device correction and trapping.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-034104, filed Feb. 18, 2010, which is hereby incorporated by reference herein in its entirety.

What is claimed is:

1. An image processing apparatus for performing image processing for a plurality of band areas obtained by dividing image data, the image processing apparatus comprising:
a dividing unit configured to divide the image data such that each of the plurality of band areas has an area overlapping an adjacent band area; and
an image processing unit configured to perform the image processing for the band areas with respect to each of a plurality of planes that constitute the image data,
wherein a processing range within a band area used in the image processing by the image processing unit differs between at least two planes among the plurality of planes.

2. The apparatus according to claim 1, further comprising:
a scanning unit configured to scan at least one of the band areas in a shorter side direction of the at least one of the band areas to determine a pixel of interest, wherein
the image processing unit is further configured to, with respect to the pixel of interest within the at least one of the band areas, perform a calculation with reference to a calculation result for a pixel for which processing has already been performed within a neighborhood area,
the image processing unit is further configured to perform the calculation for the processing range in the shorter side direction in the at least one of the band areas, and
the dividing unit is further configured to determine the number of pixels in the shorter side direction of the at least one of the band areas and divide the image data such that the overlapping area in the at least one of the band areas encompasses a border of the processing range for all of the plurality of planes.

3. The apparatus according to claim 2, wherein
the image processing unit has a holding unit configured to hold a calculation result for the pixel of interest, and
the holding unit is capable of holding calculation results for at least the number of pixels in the shorter side direction of the band area.

4. The apparatus according to claim 3, wherein the image processing unit is further configured to perform error diffusion for the pixel of interest, and hold a quantization error for the pixel of interest in the holding unit.

5. The apparatus according to claim 2, further comprising a reading unit configured to obtain the image data by reading an original using a plurality of sensors that respectively correspond to the plurality of planes,
wherein the processing range in the shorter side direction of the at least one of the band areas of each plane of the image processing unit is set such that the difference in the processing range between planes is equal to the difference in reading positions of the sensors that correspond to the respective planes.

6. The apparatus according to claim 1, wherein the image processing unit is further configured to perform the image processing for the plurality of band areas in parallel for each band area.

7. A program stored in a computer-readable storage medium for causing a computer to function as the image processing apparatus according to claim 1 by the computer executing the program.

8. An image processing method for performing image processing for a plurality of band areas obtained by dividing image data, the method comprising:
dividing, with an image processing apparatus, the image data such that each of the plurality of band areas has an area overlapping an adjacent band area; and
performing, with an image processing apparatus, the image processing for the band areas with respect to each of a plurality of planes that constitute the image data,
wherein a processing range within the band area used in the image processing differs between at least two planes among the plurality of planes.

9. An image processing apparatus for performing image processing of image data, the image processing apparatus comprising:
an obtaining unit configured to obtain, from each of a plurality of planes that constitute the image data, a plurality of processing ranges of image data; and
an image processing unit configured to perform the image processing of the plurality of processing ranges of image data obtained from each of a plurality of planes,
wherein the positions of ends of the plurality of processing ranges of image data are different from each other between at least two planes of the plurality of planes.

10. The apparatus according to claim 9, wherein the obtaining unit is configured to obtain the plurality of processing ranges of image data such that the numbers of pixels included in the plurality of processing ranges of image data of each plane in at least one of a main scanning direction and a sub-scanning direction of the image processing are equal to each other.

11. The apparatus according to claim 9, wherein the obtaining unit is configured to obtain the plurality of processing ranges of image data such that a plurality of band areas can be defined for the image data, each band area having a portion overlapping with an adjacent band area, each band area including one processing range of image data of each plane, and processing ranges of image data adjacent with each other in each plane being included in band areas adjacent with each other.

12. The apparatus according to claim 11, further comprising a holding unit configured to hold a calculation result for the pixel of interest of the image processing,
wherein the holding unit is capable of holding calculation results for at least the number of pixels in the shorter side direction of the band areas.

13. The apparatus according to claim 12, wherein
the image processing is error diffusion for the pixel of interest, and
the image processing unit is configured to hold a quantization error for the pixel of interest in the holding unit.

14. The apparatus according to claim 9, further comprising a reading unit configured to obtain the image data by reading an original using a plurality of sensors that correspond to the plurality of planes,
wherein the obtaining unit is configured to obtain the plurality of processing ranges of image data such that the differences in the positions of ends between the plurality of planes are equal to the differences in reading positions of the sensors.

15. The apparatus according to claim 9, wherein the image processing unit is further configured to perform the image processing of the plurality of processing ranges of image data in parallel.

16. A program stored in a computer-readable storage medium for causing a computer to function as the image processing apparatus according to claim 9 by the computer executing the program.

17. An image processing method for performing image processing of image data, the method being performed by an image processing apparatus, the method comprising:
obtaining, with an image processing apparatus, from each of a plurality of planes that constitute the image data, a plurality of processing ranges of image data; and
performing, with an image processing apparatus, the image processing of the plurality of processing ranges of image data obtained from each of a plurality of planes,
wherein the positions of ends of the plurality of processing ranges of image data are different from each other between at least two planes of the plurality of planes.

* * * * *